May 13, 1969     B. E. JACOBSON     3,443,679
TANDEM PULLEY DRIVE MEANS
Filed Sept. 2, 1966     Sheet 1 of 2
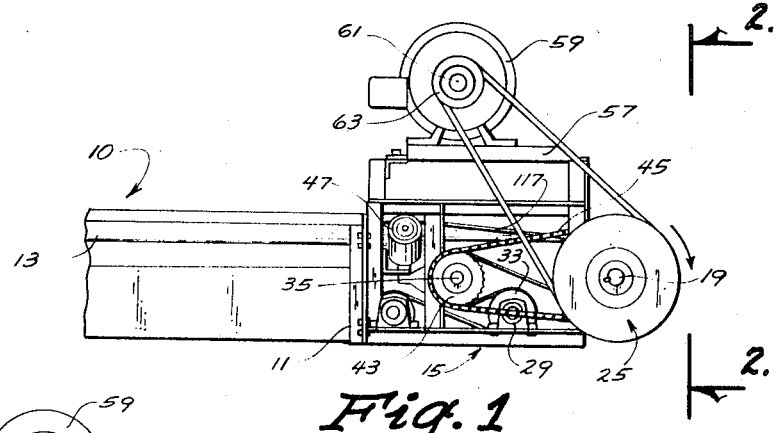
*Fig. 1*
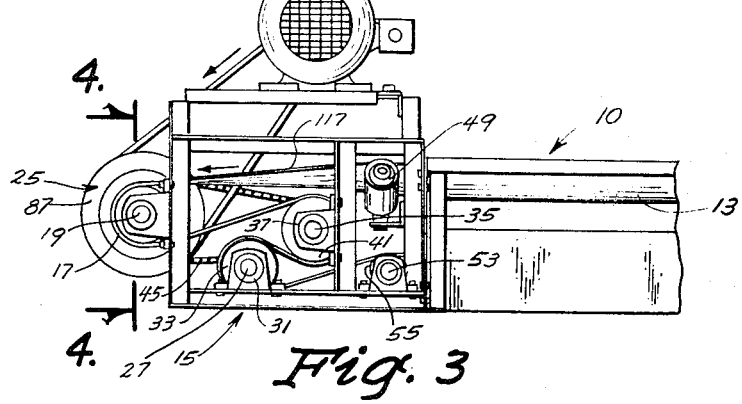
*Fig. 3*
*Fig. 4*
*Fig. 2*
INVENTOR
BERNHARD E. JACOBSON
BY
Zarley, McKee & Thomte
ATTORNEY

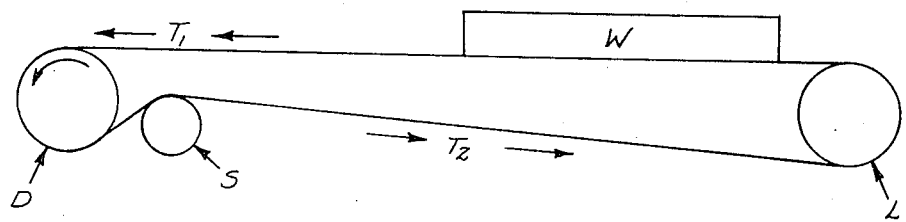
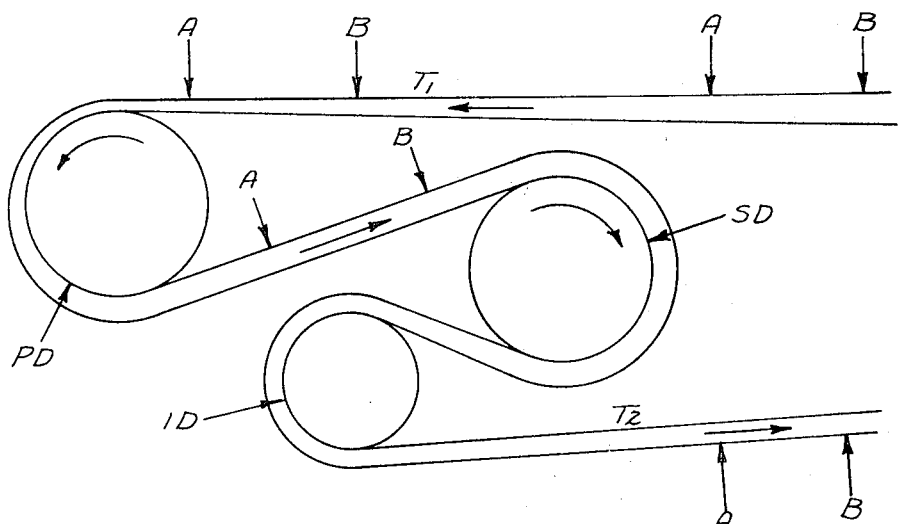

United States Patent Office 3,443,679
Patented May 13, 1969

3,443,679
TANDEM PULLEY DRIVE MEANS
Bernhard E. Jacobson, Cedar Falls, Iowa, assignor to Universal, Inc., Hudson, Iowa, a corporation of Iowa
Filed Sept. 2, 1966, Ser. No. 576,889
Int. Cl. B65g 23/04, 23/22; F16h 7/02
U.S. Cl. 198—203                                5 Claims

ABSTRACT OF THE DISCLOSURE

A tandem pulley drive means for a conveyor means wherein first and second drive pulleys are operatively rotatably secured to the conveyor frame means, a conveyor belt is mounted on the frame means and is in operative engagement with the first and second drive pulleys. A power source drives a differential means on the frame means and the differential means is connected to the first and second drive pulleys whereby the differential means permits the direction and rates of rotation of said first and second pulleys to be varied with respect to each other.

---

A tandem pulley drive means is necessary on some belt conveyors in order to provide a means for transmitting a large amount of tractive effort to a conveyor belt system without the necessity of maintaining the belt system under high tension. FIG. 5 represents a standard drive belt conveyor system having a powered head pulley D, snub pulley S, tail pulley L, and a moving endless belt of which $T_1$ is the top or tight side with load W, and $T_2$ is the return or slack side.

Assuming the top belt $T_1$ drives on a supporting surface, it can be appreciated that as the weight W increases the tension (working tension) $T_1$ will increase proportionately. If the contact pressure (face pressure) between the belt and the head pulley is not also increased, a situation will develop where the head pulley and belt surface will slide relative to each other thereby resulting in a stalled conveyor and resultant damaged belt and pulley surface. The remedy is to move the tail pulley L farther away from the head pulley creating more tension (initial tension) in the belt $T_1$ and $T_2$ which is translated into more face pressure over the head pulley and belt contact area. However, with the increasing belt tension, a situation eventually arises where the allowable belt stress is exceeded at $T_1$ where the initial and working tensions are compounded. Any further increase in the load W will require a stronger belt and most likely larger pulleys, shafts, and bearings. The tandem pulley drive means is intended to overcome the limitations of the standard drive belt conveyors such as seen in FIG. 5.

FIG. 6 below represents a tandem pulley drive conveyor having a primary head pulley PD, secondary head pulley SD, an idler ID and the remaining components illustrated in FIG. 5.

The main advantage of the tandem drive over the standard drive is that it can transmit more working tension to the belt $T_1$ without necessitating a corresponding high initial tension over the entire belt system because the necessary face pressure is maintained on the primary pulley through the tension applied to that portion of the return belt by the secondary drive pulley. Since the primary head pulley does only two-thirds of the work of the head pulley (in this invention) in FIG. A, it requires correspondingly less pressure and initial tension to prevent slippage. Since the secondary head pulley does only one-third the work of the FIG. A head pulley, the initial tension on the belt $T_1$ and $T_2$ need only be one-third as great to avoid slippage while the same amount of tractive effort is applied to the belt $T_1$. It becomes apparent that most of the allowable belt tension rating is now available for working tension to pull the load and need not be dissipated in maintaining high initial tension.

Previously, it has been necessary to utilize a separate motor and drive equipment for each pulley in a tandem pulley drive means in order to proportion the power and speed between the pulleys as the conveyor belt stretches and relaxes under varying loads during its passage over the pulleys. The problems encountered with a tandem pulley drive means is clearly illustrated in FIG. B above. If two marks A and B are placed on the belt $T_1$ towards the tail pulley and twelve inches apart, and if the belt were pulling a heavy load so as to cause about three percent stretch therein, the marks A and B would become twelve and three-eighths inches apart just as they approach the primary head pulley PD. As the belt passes around the primary head pulley, the major part of the belt tension is transmitted to the pulley and the majority of the belt stretch is recovered resulting in marks A and B becoming approximately twelve and one-eighth inches apart as this portion approaches the secondary head pulley SD. Since the belt between points A and B is shorter, thicker and wider here (between PD and SD) than it was as it approached the primary head pulley PD, it follows that the secondary head pulley SD must turn slower surface feet per minute than the primary head pulley to pull the same volume of belt around it.

It can be seen that the belt thickness and width at any point are functions of its volume at this point, which in turn is directly proportional to the amount of stretch the belt has undergone or recovered, and the primary and secondary head pulleys must rotate at rates proportional to the varying amounts of stretch in the portions of the belt about to pass thereover if both pulleys are to do their proper share of work. The purpose then of the tandem pulley drive means set forth in this specification is to provide a means whereby the primary head pulley can pull the belt at a desired speed, providing approximately two-thirds of the tractive effort while the secondary head pulley rotates at whatever speed is necessary to apply the remaining tractive effort to the belt as it varies in length in its passage around the pulleys.

Therefore, it is a principal object of this invention to provide a tandem pulley drive means for a conveyor or the like wherein a single power source is used.

A further object of this invention is to provide a tandem pulley drive means for a conveyor or the like which utilizes a planetary type speed reducer as both a drive component and a differential.

A further object of this invention is to provide a tandem pulley drive means for a conveyor or the like wherein the torque is proportionately shared by both the primary and secondary pulleys without said pulleys being rotated at the same speed and without said pulleys required to be of any exact diameter.

A further object of this invention is to provide a tandem pulley drive means for a conveyor or the like wherein the rates of rotation of the primary and secondary drive pulleys are automatically regulated to compensate for varying loads placed upon the conveyor belt.

A further object of this invention is to provide a tandem pulley drive means which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a left side view of the tandem pulley drive means mounted on a conveyor;

FIG. 2 is an end view of the drive means illustrated in FIG. 1 as would be seen on line 2—2 thereof;

FIG. 3 is a right side view of the drive means as would be seen on line 3—3 of FIG. 2;

FIG. 4 is a sectional view of the reduction pulley means as would be seen on line 4—4 of FIG. 3, at an enlarged scale;

FIG. 5 is a schematic view of a standard drive belt conveyor; and

FIG. 6 is a schematic view of applicant's tandem drive pulley means.

FIG. 1 illustrates a conveyor 10, only one end of which is shown, and including a frame means 11 having troughing 13 secured thereto and a head frame assembly 15. A horizontally disposed primary drive pulley 17 is mounted on a shaft 19 which is rotatably mounted on the outer end of head frame assembly 15 by means of bearings 21 and 23. A reduction pulley means 25 of the planetary gear type is operatively connected to one end of shaft 19 and will be described in detail hereinafter.

A horizontally disposed shaft 27 is rotatably secured to head frame assembly 15 by means of bearings 29 and 31 at a point inwardly and downwardly from shaft 19. An idler pulley 33 is secured to shaft 27 for rotation therewith. A horizontally disposed shaft 35 is rotatably secured to head frame assembly 15 by means of bearings 37 at opposite ends thereof at a point upwardly and inwardly from shaft 27 and has a secondary drive pulley 41 secured thereto for rotation therewith. A sprocket 43 is secured to one end of shaft 35 and is adapted to receive a drive chain 45 extending therearound. A pair of belt guide pulleys 47 and 49 are rotatably secured to head frame assembly and are adapted to guide the conveyor belt 117 onto troughing 13. A shaft 53 is rotatably secured to head frame assembly 15 by means of bearings and has a pulley 55 mounted thereon for rotation therewith at a point below belt guide pulleys 47 and 49. A motor support bracket 57 is secured to the upper end of head frame assembly 15 by any suitable means and has a motor 59 secured thereto. Motor 59 is provided with a drive shaft 61 having a multiple groove pulley 63 secured thereto. The other end of conveyor 10 is of conventional design and would include various pulleys and belt tightening means.

The reduction pulley means 25 is fully disclosed in Patent No. 2,794,350 and is obtainable from the Hart Reduction Pulley Company, 1116 Adams St., Waukesha, Wis. Pulley means 25 is seen to include a sleeve 65 which embraces shaft 19. A gear 67 rotatably embraces sleeve 65 and has a hub 69 extending inwardly therefrom which is splined to a sprocket means 71 at 73. A bearing means 75 is provided between the inside diameter of sprocket means 71 and the inner end of sleeve 65 as best seen in FIG. 4. An end cap 77 is secured to sprocket means 71 by bolt 79 as seen in FIG. 4 to limit the lateral movement of sprocket means 71 with respect to the sleeve 65. A gear 81 having an outwardly extending hub 83 is rigidly secured to the outer end of shaft 19 by means of a split tapered sleeve 85 which is secured to hub 83 by screws and keyed to shaft 19.

A case 87 comprised of case members 89 and 91 secured together by bolts 93 rotatably embraces hubs 69 and 83 and is supported by bearings 95 and 97. A pair of shafts 99 and 101 are rotatably mounted in case 87 as seen in FIG. 4 and support gears 103, 105 and 107, 109 respectively which are keyed or pinned to the respective shafts. There may be one, two or four shafts comparable to shafts 99 and 101 depending upon the power to be transmitted. Gears 103 and 107 engage the teeth of gear 81 while gears 105 and 109 engage the teeth of gear 67.

The outer periphery of case member 89 is provided with a plurality of grooves 111 which receive belts 113 extending from pulley 63. A chain 45 extends around and between sprockets 43 and 71. Sprockets 43 and 71 are preferably chosen in a ratio combined with the reducer gear ratio so as to proportion the torque in a two to one ratio between the pulleys 17 and 41. A conveyor belt 117 passes along troughing 13, as viewed in FIG. 3, then passes over the upper, forward and lower portions of primary drive pulley 17, thence around the upper, rearward and lower portions of secondary drive pulley 41, thence around the upper, forward and lower portions of idler pulley 33, thence over pulley 55, and thence to the tail pulley positioned at the other end of the conveyor means.

The normal method of operation is as follows. Motor 59 is energized to rotate case 87 of reduction gear means 25 in a counter-clockwise direction as viewed in FIG. 3. The rotation of case 87 by belts 113 causes shafts 99 and 101 to be moved therewith around shaft 19. The engagement of gears 103 and 107 with gear 81 and the engagement of gears 105 and 109 with gear 67 causes rotation thereof in conventional fashion. The rotation of gear 81 in a counter-clock-wise direction causes shaft 19 and hence pulley 17 to be rotated in the same direction as case 87 due to the rigid connection between hub 83 of gear 81 and shaft 19. If gears 81 and 67 were of the same size, then when gear 67 is held, gears 103 and 105 would merely track around and gear 81 would not rotate at all. If gear 81 was smaller than gear 67, it can be seen that gear 81 would rotate in a direction opposite to that of case 87 when gear 67 is held. In addition to this situation, it should also be realized that the speed and direction of gear 81 relative to the case 87 will be influenced by the relative speed and direction of gear 67 and the case 87 and vice versa. In the normal method of operation as previously mentioned, when gear 81 is rotated in a counter-clock-wise direction, gear 67 will cause sprocket means 71 to be rotated in a direction opposite to that of shaft 19 which results in pulley 41 being rotated in an opposite direction to that of pulley 17.

It can be appreciated that the hub 69 of gear 67 serves the function of the reaction hub to enable the torque to be shared by both of pulleys 17 and 41 though they need not rotate at the same r.p.m. or be of equal diameters. Gear 67 is a held gear in a relative sense only in this application. The holding arm is a dynamic continuous one, namely a sprocket 71 which is "anchored" by a chain to the sprocket 43. The whole system becomes a locked train device with the conveyor belt as a flexible element in it. The pulleys 17 and 41 are permitted differences in their rates of rotation due to the differential type planetary gear means of reduction pulley means 25. Thus, if one of the pulleys 17 or 41 are caused to rotate at a different speed than the other, the various gears in case 87 simply track around each other in conventional fashion to permit the required differential in the rates of rotation of the pulleys. Reduction pulley means 25 not only serves as a drive component but also serves as a differential to achieve the ultimate in efficiency for a tandem pulley drive means for a conveyor. If desired, pulleys 41 and 33 can be interchanged and pulley 41 could then be operated in the same direction as pulley 17 by an appropriate chain arrangement. The function and purposes of the tandem drive will not be changed by this pulley arrangement.

Thus it can be seen that a tandem pulley drive means has been provided for a conveyor or the like which utilizes a single power source and which permits the primary and secondary drive pulleys to be rotated at different speeds to compensate for various amounts of stretch of the belt passing thereover due to varying loads imposed on the belt. It can also be seen that a means has been provided for transmitting a large amount of tractive effort to a belt system without the necessity of keeping the belt system under high tension.

Thus it can be seen that the device accomplishes at least all of its stated objectives.

I claim:
1. In combination,
a conveyor means including a frame means,
a differential means on said frame means and comprising a case means rotatably mounted on a single drive shaft, an output sun gear rotatably mounted in said case means and being rigidly secured to said drive shaft, a second sun gear rotatably mounted in said case means and being rotatable with respect to said drive shaft, a plurality of planetary gears in said case and being in engagement with said output sun gear and said second sun gear,
power means operatively secured to said case means,
a first drive pulley rigidly mounted on said drive shaft,
a second drive pulley operatively connected to said second sun gear, and
a conveyor belt means on said frame in operative engagement with said first and second drive pulleys.

2. The combination of claim 1 wherein said power means is connected to said case means by at least one continuous belt in engagement with the periphery of said case means.

3. The combination of claim 1 wherein said differential means rotates said first and second pulleys in opposite directions.

4. The combination of claim 1 wherein said differential means includes a reduction gear means whereby said second drive pulley is rotated at a speed less than said first drive pulley.

5. The combination of claim 1 wherein said differential means is connected to said first and second drive pulleys so as to proportion the tractive effort between said first and second drive pulleys in a ratio of approximately two-to-one.

References Cited

UNITED STATES PATENTS

| | | | |
|---|---|---|---|
| 1,706,501 | 3/1929 | Smith | 198—203 |
| 1,728,899 | 7/1929 | Hegeler et al. | |
| 2,393,563 | 1/1946 | Petterson | 198—203 |
| 2,794,350 | 6/1957 | Hart | 74—766 |

FRED C. MATTERN, Jr., *Primary Examiner.*

JAMES A. WONG, *Assistant Examiner.*

U.S. Cl. X.R.

74—216.5, 722, 766